(12) United States Patent
Yeh

(10) Patent No.: US 8,177,111 B2
(45) Date of Patent: May 15, 2012

(54) HANDHELD ELECTRONIC DEVICE VEHICLE HOLDER

(75) Inventor: Chun-Liang Yeh, Taipei (TW)

(73) Assignee: Asustek Computer Inc., Taipei (TW)

( * ) Notice: Subject to any disclaimer, the term of this patent is extended or adjusted under 35 U.S.C. 154(b) by 1000 days.

(21) Appl. No.: 12/213,444

(22) Filed: Jun. 19, 2008

(65) Prior Publication Data

US 2009/0184145 A1 Jul. 23, 2009

(30) Foreign Application Priority Data

Aug. 28, 2007 (TW) ................................ 96131927 A

(51) Int. Cl.
*B60R 11/00* (2006.01)

(52) U.S. Cl. ........ 224/571; 224/483; 224/567; 224/929; 379/454; 381/87

(58) Field of Classification Search .................. 224/312, 224/482, 483, 567, 571, 929; 381/87; 379/446, 379/447, 454, 455
See application file for complete search history.

(56) References Cited

U.S. PATENT DOCUMENTS

| | | | | |
|---|---|---|---|---|
| 3,244,981 A | * | 4/1966 | Der Tatevasian | ............. 455/351 |
| 4,406,928 A | * | 9/1983 | MacKenzie | .................... 379/454 |
| 5,040,712 A | * | 8/1991 | Pesonen et al. | ............... 224/567 |
| 5,187,744 A | * | 2/1993 | Richter | ......................... 224/571 |
| 5,703,946 A | * | 12/1997 | Chen | ............................. 379/446 |
| 5,847,922 A | | 12/1998 | Smith et al. | |
| 6,043,976 A | | 3/2000 | Su | |
| 6,138,041 A | * | 10/2000 | Yahia | ............................. 379/446 |
| 6,510,311 B1 | * | 1/2003 | Stitt | ............................. 455/90.3 |
| 6,654,472 B1 | * | 11/2003 | Jeon | ............................. 381/349 |
| 6,932,377 B2 | * | 8/2005 | Bretschger et al. | ........... 224/409 |
| 2002/0009195 A1 | * | 1/2002 | Schon | ........................... 379/454 |
| 2002/0190176 A1 | | 12/2002 | Louh | |
| 2003/0132884 A1 | * | 7/2003 | Ragner et al. | ................. 343/702 |

FOREIGN PATENT DOCUMENTS

JP 2005-136895 A * 5/2005

* cited by examiner

*Primary Examiner* — Gary Elkins

(74) *Attorney, Agent, or Firm* — Birch, Stewart, Kolasch & Birch, LLP

(57) ABSTRACT

A handheld electronic device vehicle holder is used to hold a handheld electronic device having a loudspeaker. The handheld electronic device vehicle holder includes a holding body, and the holding body has a sound guiding groove extending to the edge of the holding body. When the handheld electronic device is place on the holding body, the sound outlet of the loudspeaker of the handheld electronic device is placed in the sound guiding groove. Then, sounds produced from the handheld electronic device are guided to the edge of the holding body through the sound guiding groove.

10 Claims, 4 Drawing Sheets

HANDHELD ELECTRONIC DEVICE VEHICLE HOLDER

BACKGROUND OF THE INVENTION

1. Field of the Invention

The invention relates to a handheld electronic device vehicle holder and, more particularly, to a handheld electronic device vehicle holder having a sound guide function.

2. Description of the Related Art

Along with the progress of the science and technology, various handheld electronic devices bring people much convenience in daily life to enhance the life quality of the people, and then the handheld electronic devices have been essential in the daily life. For example, since portable handheld electronic devices such as a personal digital assistant (PDA) and a mobile phone are carried conveniently, vehicle drivers often carry the portable handheld electronic devices to use in the vehicles. However, if the users carry the portable handheld electronic devices by themselves after they get on the vehicles, inconvenience in use is brought, and it is difficult for the users to receive phones or view the portable handheld electronic devices. Therefore, the users usually insert the portable handheld electronic devices into holders to facilitate the usage and the safe driving after they get on the vehicles.

FIG. 1 is a schematic diagram showing a conventional vehicle holder. The vehicle holder 1 includes a body 10, a bracket 11 and a fixing stand 12. The body 10 has a holding body 101 and two holding plates 102, and the holding body 101 and the holding plates 102 form holding space for holding a portable handheld electronic device 2. The holding plates 102 also may be two clips which are disposed at two sides of the holding body 101 to clip the portable handheld electronic device 2.

The bracket 11 is used to connect the holding body 101 and the fixing stand 12. A sucker (not shown) may be disposed at the back of the fixing stand 12 to allow the fixing stand 12 to be attached to a windscreen of a vehicle or any place that the users want to attach the fixing stand 12 to. Also, a locking element or a clip may be used to fix the portable handheld electronic device 2 to blades at the cooling air outlet of the vehicle.

The common vehicle holder can help the user to fix the portable handheld electronic device in the vehicle. However, since the front of the handheld electronic device is provided with a display panel or an operation key for the user to watch or input, the sound outlet of the audio device of the handheld electronic device usually is disposed at the back of the handheld electronic device to meet with the lightness, slimness and portative requirements. For example, the loudspeaker 21 in FIG. 1 is disposed in the back of the handheld electronic device to decrease the whole volume of the handheld electronic device.

When the above handheld electronic device is normally used, the sound output direction of the handheld electronic device is away from the users. In this way, the sound obtained by the users has small volume, and the whole sound quality is bad. Therefore, the users often miss calls, or they cannot clearly hear the content of the calls. That is, the conventional vehicle holder does not achieve the objective of facilitating usage.

No matter the above vehicle holder or other handheld electronic device holder should be designed to cooperate with the personal digital assistant (PDA) or the mobile phone which has diverse functions. For example, each supplier often adds a music player function or other related media functions to the portable handheld electronic device. Therefore, it is an important problem that the user cannot obtain a normal quality of received sounds when the user places the handheld electronic device on the holder, and the problem needs to be solved.

BRIEF SUMMARY OF THE INVENTION

The invention provides a handheld electronic device vehicle holder for holding a handheld electronic device, and the handheld electronic device has a loudspeaker.

The handheld electronic device vehicle holder includes a holding body, and the holding body has a sound guiding groove extending to the edge of the holding body. When the handheld electronic device is placed at the holding body, the sound outlet of the loudspeaker of the handheld electronic device is placed in the sound guiding groove to allow sounds produced from the handheld electronic device to be guided to the edge of the holding body through the sound guiding groove.

The advantages and spirit of the invention are illustrated with the following embodiments and the accompanying drawings.

DETAILED DESCRIPTION OF THE EMBODIMENTS

Figure 1:
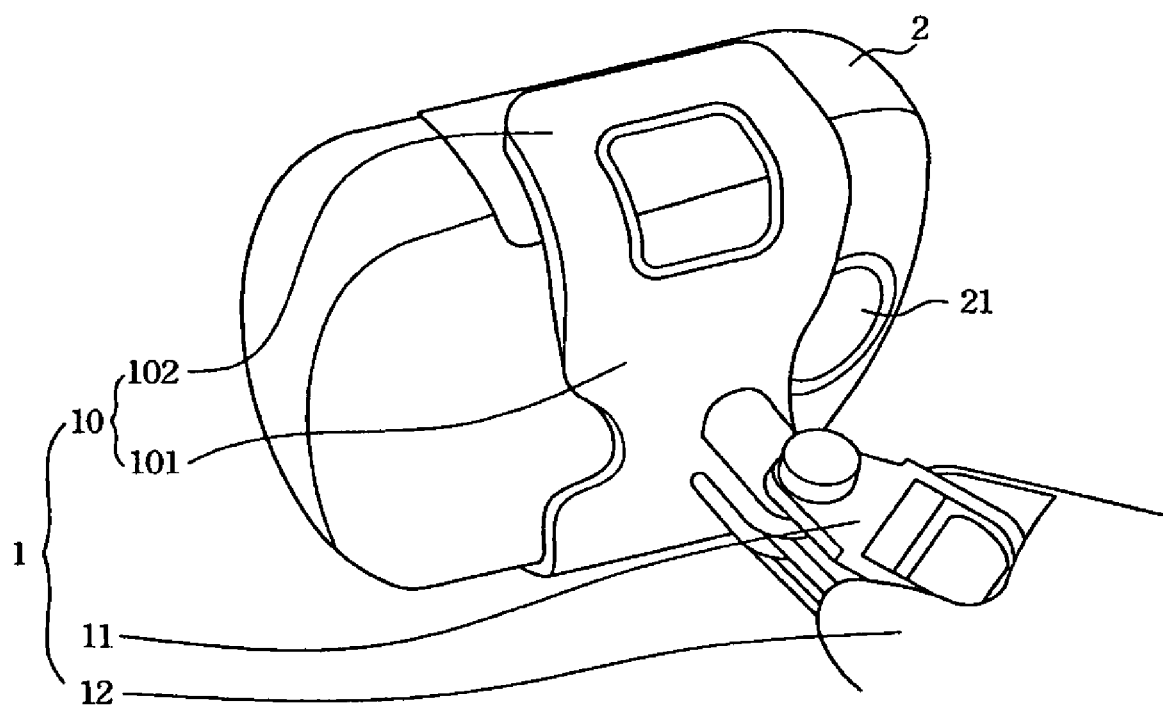
FIG. 1 is a schematic diagram showing a conventional handheld electronic device vehicle holder.
Figure 2:
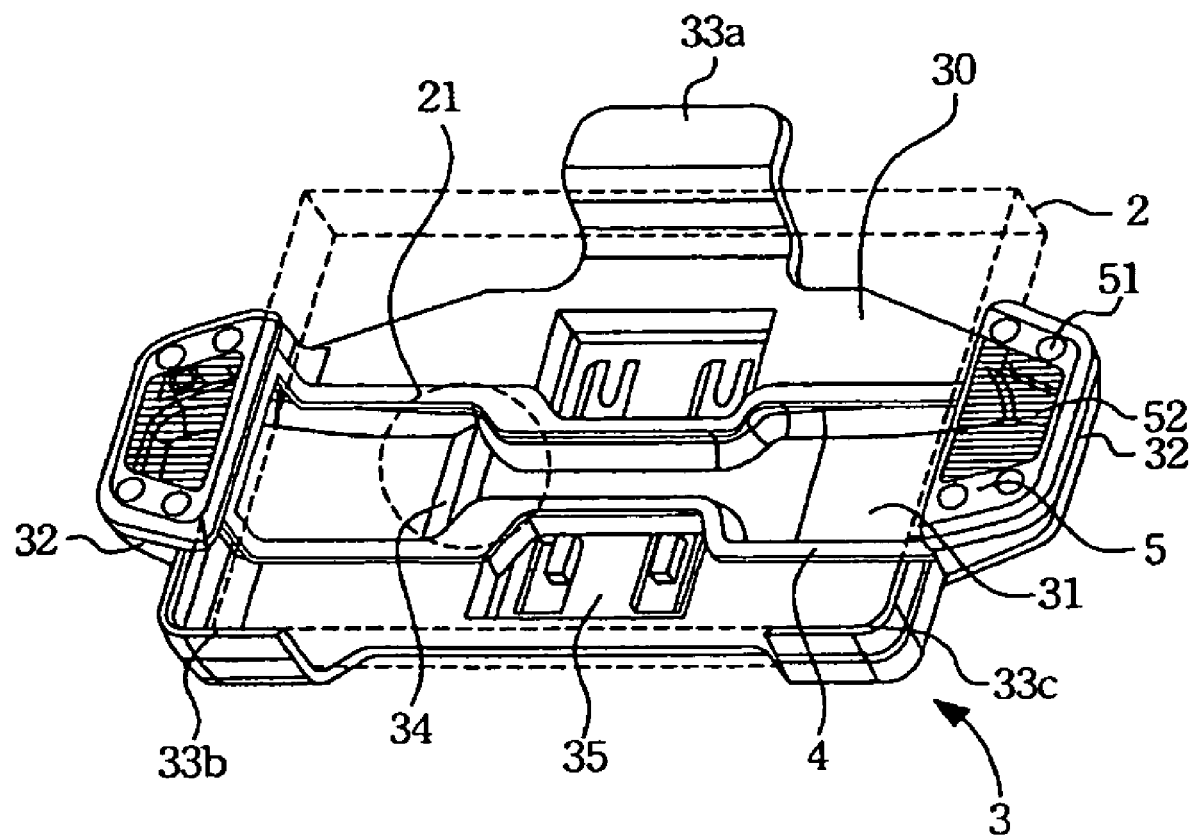
FIG. 2 is an assembly diagram showing a handheld electronic device vehicle holder according to an embodiment of the invention.

FIG. 2 is an assembly diagram showing a handheld electronic device vehicle holder according to an embodiment of the invention. The handheld electronic device vehicle holder is used to hold a handheld electronic device 2 and guide sounds emitted by a loudspeaker 21 of the handheld electronic device to two sides of the handheld electronic device 2. The handheld electronic device 2 may be a portable handheld electronic device which is one of a digital mobile television, a personal digital assistant (PDA), a mobile phone and a global positioning system. The outline of the handheld electronic device 2 is drawn with broken lines to allow the handheld electronic device vehicle holder 3 shaded by the handheld electronic device 2 to be clearly observed, and then the mode of disposing each element of the handheld electronic device vehicle holder and the relationship between the handheld electronic device vehicle holder and the handheld electronic device 2 can be understood.

As shown in FIG. 2, the handheld electronic device vehicle holder 3 mostly includes a holding body 30. The panel of the holding body 30 has a sound guiding groove 31, and each of the two sides of the holding body 30 has a protrudent edge 32. The sound guiding groove 31 extends to the protrudent edges 32 at the two sides of the holding body 30. When the handheld electronic device 2 is placed on the holding body 30, the protrudent edges 32 at the two sides of the holding body 30 are exposed, and the sound outlet of the loudspeaker 21 of the handheld electronic device 2 is placed in the sound guiding groove 31 to allow the sounds produced from the handheld electronic device 2 to be guided to the protrudent edges 32 at the two sides of the holding body 30 through the sound guiding groove 31.

Figure 3:
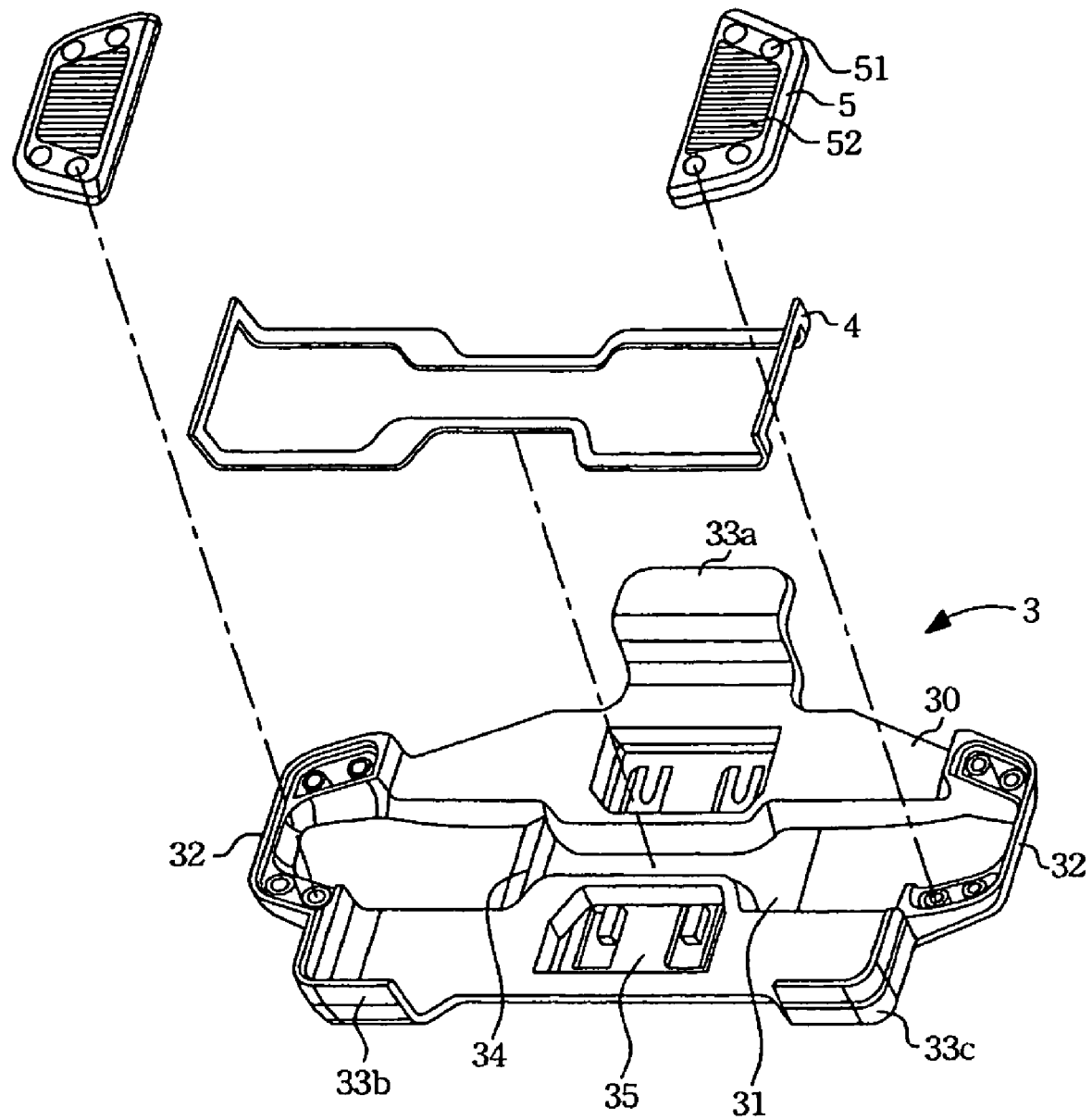
FIG. 3 is an exploded diagram showing a handheld electronic device vehicle holder of an embodiment of the invention.

FIG. 3 is an exploded diagram showing a handheld electronic device vehicle holder according to an embodiment of the invention, and the structural feature of each element is illustrated with FIG. 2 and FIG. 3. As shown in FIG. 3, the holding body 30 may be a rectangular plate, and the edges of the holding body 30 extend and are bent to form a plurality of holding plates 33. Part of the long edge at the top of the holding body 30 extends outside and is bent to form a top holding plate 33a, and corners at the left and right sides of the bottom of the holding body 30 also extend and are bent to form two bottom holding plates 33b and 33c. A holding space for holding the handheld electronic device 2 is formed between the top holding plate 33a, the bottom holding plates 33b and 33c and the panel of the holding body 30. After the handheld electronic device 2 is inserted into the holding space, the two corners at the bottom of the handheld electronic device 2 are holder by the holding plates 33 to achieve an effect of fixing the handheld electronic device 2. The mode of disposing the holding plates 33 extended from the holding body 30 is not limited. The holding plates 33 may be composed of a top holding plate and a bottom holding plate, or only a bottom holding plate is used to holder the bottom of the handheld electronic device 2. Common modes of holding and fixing objects can be utilized in the invention.

In a preferred embodiment, the panel of the holding body 30 has the sound guiding groove 31 extending to the two sides of the holding body 30. When the handheld electronic device 2 is placed on the holding body 30, the loudspeaker 21 of the handheld electronic device 2 just faces the sound guiding groove 31 to allow the sounds produced from the handheld electronic device 2 to be guided to the two sides of the holding body 30 through the sound guiding groove 31. Each of the two sides of the holding body 30 has a protrudent edge 32, respectively, and the sound guiding groove 31 extends to surfaces of the protrudent edges 32. When the handheld electronic device 2 is placed on the holding body 30, the protrudent edges 32 at the two sides of the holding body 30 are exposed outside of the handheld electronic device 2 as shown in FIG. 2. The sounds produced from the handheld electronic device 2 are transmitted to the two sides of the holding body 30 through the sound guiding groove 31, and then they are transmitted outside of the handheld electronic device 2 after they are transmitted to the protrudent edges 32. The inner wall of the sound guiding groove 31 may be a smooth surface to maintain the transmission quality of the sounds produced from the handheld electronic device 2 to avoid sound consumption which can cause a distortion result after the transmission process.

The holding body 30 of the embodiment further has a protrusion 34 formed at the bottom surface of the sound guiding groove 31, and the position of the protrusion 34 faces the position of the loudspeaker 21 of the handheld electronic device 2. The protrusion 34 is used to part the sounds produced from the handheld electronic device 2, and then the parted sounds are guided into the sound guiding groove 31 at the two sides of the protrusion 34 along the protrusion 34. Finally, the sounds are transmitted toward the two protrudent edges 32 at the two sides of the holding body 30. A soundproof member 4 may be disposed along the edge of the sound guiding groove 31 to seal the handheld electronic device 2 and the sound guiding groove 31, and then sound waves are concentratedly transmitted to the protrudent edges 32 at the two sides of the holding body 30 to prevent the sounds produced from the handheld electronic device 2 being emitted outside via apertures between contact surfaces of the handheld electronic device 2 and the sound guiding groove 31. The soundproof member 4 may be a piece of foam or a rubber strip, but it is not limited.

As shown in FIG. 3, the holding body 30 has two locking holes 35. The locking holes 35 are disposed at two sides of the sound guiding groove 31, respectively, and they are used to screw the handheld electronic device vehicle holder 3 with screws. A clip also may be used to clip the handheld electronic device vehicle holder 3 through the locking holes 35 first, and then the handheld electronic device vehicle holder 3 can be fixed to an air conditioner hole in a vehicle or other places which suitable to fix the handheld electronic device vehicle holder 3 via the clip. The styles and uses of the handheld electronic device vehicle holder 3 are various, and as for the preferred embodiment, the handheld electronic device vehicle holder 3 is a holder used in a vehicle. The implementing mode of the handheld electronic device vehicle holder 3 is not limited by the said embodiment. That is, a bracket may be disposed at the back of the handheld electronic device vehicle holder 3 to allow the handheld electronic device vehicle holder 3 to stand on a console in a vehicle, or the handheld electronic device vehicle holder 3 may be attached to a windscreen by a sucker. People having ordinary skill in the art should know that the fixing mode is not limited in the locking mode, and they may utilize whatever mode that they can easily know, such as a pasting mode, a fastening mode or a magnetic attraction mode to fix the handheld electronic device vehicle holder 3.

To prevent the sounds produced from the handheld electronic device 2 being emitted via the locking holes 35, as shown in the drawings, partial sound guiding groove 31 adjacent to the locking holes 35 has a smaller width to avoid the openings of the locking holes 35. The shapes of the sound guiding groove 31 and the soundproof member 4 disposed along the edge of the sound guiding groove 31 are not limited in the shapes shown in the drawings of the embodiment, and they can be changed according to different fixing modes. For example, the sound guiding groove 31 may have identical width to have a long bar shape when a pasting mode is utilized and no openings exist.

As shown in FIG. 3, the handheld electronic device vehicle holder 3 further includes a cover 5 covering the top surfaces of the protrudent edges 32, and the cover 5 is screwed on the holding body 30 via screws 51. The cover 5 further has a plurality of sound outlets 52. When the sounds produced from the handheld electronic device 2 are transmitted to the protrudent edges 32 via the sound guiding groove 31, the sounds can pass through the sound outlets 52 on the cover 51 to be emitted outside. The cover 5 is joined with the protrudent edges 32, and it can also be fixed to the protrudent edges 32 in a fastening mode. The cover 5 also may be integrated with the holding body 30, and the implementing mode of the cover 5 is not limited.

Figure 4:
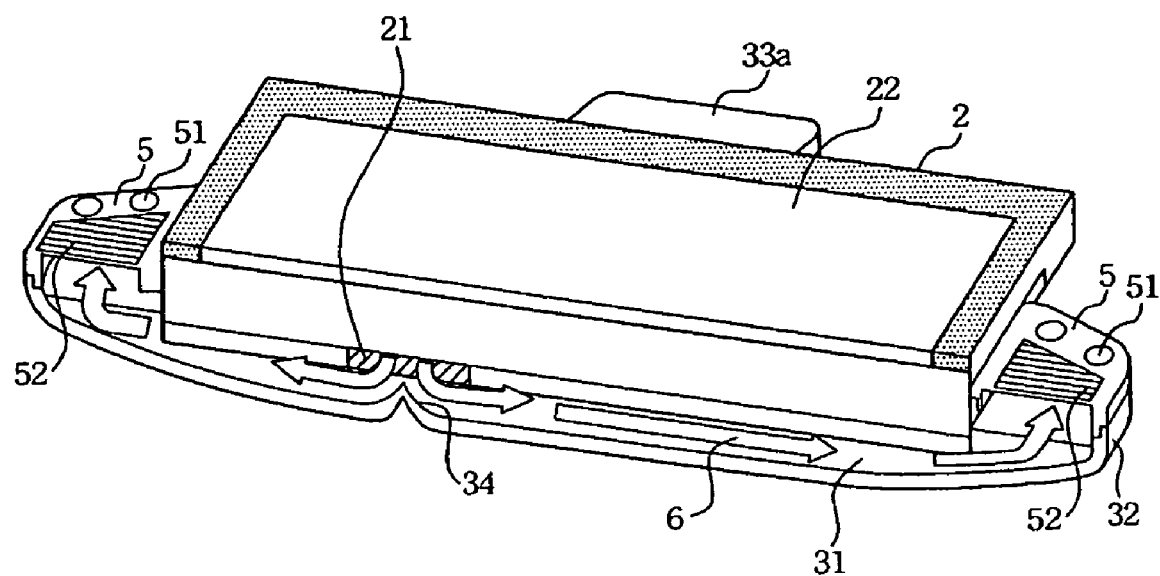
FIG. 4 is a schematic diagram showing a handheld electronic device vehicle holder of FIG. 2 and a handheld electronic device.

Structures and relationships of the elements are described in detail in the above content, and the use mode and the sound transmitting mode of the handheld electronic device vehicle holder 3 formed by the said elements are illustrated with FIG. 4.

FIG. 4 is a schematic diagram showing a handheld electronic device vehicle holder of FIG. 2 and a handheld electronic device. As shown in FIG. 4, when the handheld electronic device 2 is placed on the holding body 30, the protrudent edges at the two sides of the holding body 30 are just located at the right and left sides of the handheld electronic device 2, and the loudspeaker 21 of the handheld electronic device 2 just faces the protrusion 34 on the holding body 30. After the sounds produced from the handheld electronic device 2 are emitted, they are guided into the sound guiding groove 31 at the two sides of the protrusion 34. Then, the sounds are transmitted to the protrudent edges 32 via the sound guiding groove 31 extending to the two sides of the holding body 30, and finally they are transmitted outside via the protrudent edges 32. At that moment, the sounds produced from the handheld electronic device 2 that originally are emitted in a direction opposite to the users are guided out from the front of the handheld electronic device 2 to solve the problems that the sounds are distorted and unclear, and the volume of the sounds is too small when the conventional handheld electronic device vehicle holders are used.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A vehicle holder of a handheld electronic device, the handheld electronic device having a loudspeaker, and the vehicle holder comprising:
   a holding body configured to hold the handheld electronic device, comprising:
   a sound guiding groove, extending to two side edges of the holding body; and
   a protrusion disposed on the bottom surface of the sound guiding groove corresponding to the position of the loudspeaker;
   wherein the sound guiding groove is configured to engage a sound outlet of the handheld electronic device, when the electronic device is disposed at the holding body, so that sounds produced from the handheld electronic device can be guided into the sound guiding groove at two sides of the protrusion toward the two side edges.

2. The vehicle holder according to claim 1, wherein each of said two side edges of the holding body has a protrudent edge, the sound guiding groove extends to the protrudent edges, and when the handheld electronic device is placed on the holding body, the protrudent edges at the two sides of the holding body are exposed.

3. The vehicle holder according to claim 1, wherein the edges of the holding body extend and are bent to form a holding plate, and the holding plate and the panel of the holding body form a holding space for holding the handheld electronic device.

4. The vehicle holder according to claim 1, wherein a soundproof member is disposed along the edge of the sound guiding groove to seal the handheld electronic device and the sound guiding groove to prevent the sounds being emitted outside.

5. The vehicle holder according to claim 4, wherein the soundproof member is a piece of foam or a rubber strip.

6. The vehicle holder according to claim 1, wherein the holding body has a plurality of locking holes which are disposed at two sides of the sound guiding groove, respectively.

7. The vehicle holder according to claim 1 further comprising a cover which covers the top surface of the protrudent edge, is screwed to the holding body via screws and has a plurality of sound outlets.

8. The vehicle holder according to claim 1 further comprising a cover covering the top surface of the protrudent edge, wherein the cover and the holding body are integrally formed, and the cover has a plurality of sound outlets.

9. The vehicle holder according to claim 1, wherein the inner wall of the sound guiding groove is a smooth surface.

10. The vehicle holder according to claim 1, wherein the handheld electronic device is a portable handheld electronic device which is one of a digital mobile television, a personal digital assistant (PDA), a mobile phone and a global positioning system (GPS).

* * * * *